United States Patent [19]

Katz

[11] Patent Number: 4,820,537
[45] Date of Patent: Apr. 11, 1989

[54] METHOD FOR DECAFFEINATING COFFEE WITH A SUPERCRITICAL FLUID

[75] Inventor: Saul N. Katz, Monsey, N.Y.

[73] Assignee: General Foods Corporation, White Plains, N.Y.

[21] Appl. No.: 166,748

[22] Filed: Mar. 8, 1988

Related U.S. Application Data

[63] Continuation of Ser. No. 24,906, Mar. 13, 1987, abandoned, which is a continuation of Ser. No. 752,879, Jul. 8, 1985, abandoned, which is a continuation-in-part of Ser. No. 506,750, Jun. 22, 1983, abandoned.

[51] Int. Cl.$^4$ .............................................. A23F 5/20
[52] U.S. Cl. .................................. 426/481; 426/427; 426/428; 426/424; 426/422; 426/478; 426/479; 426/432; 426/433; 426/434
[58] Field of Search ............... 426/422, 424, 427, 428, 426/432, 433, 434, 478, 479, 481

[56] References Cited

U.S. PATENT DOCUMENTS

| | | | |
|---|---|---|---|
| 3,088,394 | 5/1963 | Thornhill | 99/289 X |
| 3,092,515 | 6/1963 | Pike et al. | 134/25 |
| 3,806,619 | 4/1974 | Zosel | 134/25 |
| 3,862,347 | 1/1975 | Thijssen et al. | 426/434 |
| 3,969,196 | 7/1976 | Zosel | 203/49 |
| 4,007,116 | 2/1977 | Gappa et al. | 210/676 |
| 4,168,324 | 9/1979 | Roselius et al. | 426/312 |
| 4,246,291 | 1/1981 | Prasad et al. | 426/387 |
| 4,247,570 | 1/1981 | Zosel | 426/481 |
| 4,251,559 | 2/1981 | Margolis et al. | 426/490 |
| 4,255,458 | 3/1981 | Roselius et al. | 426/427 X |
| 4,260,639 | 4/1981 | Zosel | 426/478 |
| 4,322,445 | 3/1982 | Peter et al. | 426/427 X |
| 4,341,804 | 7/1982 | Prasad et al. | 426/387 |
| 4,348,422 | 9/1982 | Zosel | 426/475 |
| 4,364,964 | 12/1982 | van der Stegen | 426/427 X |
| 4,364,965 | 12/1982 | van der Stegen et al. | 426/427 X |
| 4,411,923 | 10/1983 | Hubert et al. | 426/427 X |

FOREIGN PATENT DOCUMENTS

0010636 5/1980 European Pat. Off. .

OTHER PUBLICATIONS

Hassler, Purification with Activated Carbon, 1974, Chemical Publ. Co., New York, pp. 74–86.
Derwent, Week 87/46, p. 2, June 6, 1988, "Extn. of Foods Using Super-Critical Carrier Gas, Added After Prod. Has Been Pressurized to Equivalent Pressure", Extrakta Strauss 20/08/81 DE 133032.

Primary Examiner—Joseph Golian
Attorney, Agent, or Firm—D. J. Donovan; T. R. Savoie; J. T. Harcarik

[57] ABSTRACT

A method of extracting caffeine from green coffee beans whereby an essentially caffeine-free supercritical fluid is continuously fed to one end of an extraction vessel containing green coffee beans and caffeine-laden supercritical fluid is continuously withdrawn from the opposite end. A portion of decaffeinated beans is periodically discharged while a fresh portion of undecaffeinated beans is essentially simultaneously charged to the extraction vessel. The caffeine-laden supercritical fluid is fed to a countercurrent water absorber. Supercritical carbon dioxide is the preferred supercritical fluid. The method of the present invention is more efficient than batch processes and produces an improved decaffeinated coffee.

10 Claims, 2 Drawing Sheets

METHOD FOR DECAFFEINATING COFFEE WITH A SUPERCRITICAL FLUID

This application is a continuation of application Ser. No. 024,906, filed Mar. 13, 1987, now abandoned, which in turn is a continuation of application Ser. No. 752,879, filed July 8, 1985, now abandoned, which in turn is a continuation-in-part of application Ser. No. 506,750, filed June 22, 1983, now abandoned.

TECHNICAL FIELD

The present invention relates to a method of extracting caffeine from green coffee beans with a supercritical fluid. More particularly, the invention involves continuously feeding an essentially caffeine-free supercritical fluid to one end of an extraction vessel containing green coffee beans and continuously withdrawing a caffeine-laden super-critical fluid from the opposite end. A portion of decaffeinated beans is periodically discharged while a fresh portion of undecaffeinated beans is essentially simultaneously charged to the extraction vessel. Substantially all the caffeine is then removed from the caffeine-laden supercritical fluid stream in a countercurrent water absorber. The method of the present invention is more efficient and produces a better quality decaffeinated coffee than prior art batch processes.

BACKGROUND ART

Various coffee decaffeination methods are well-known in the art. The most common techniques involve first swelling the coffee beans with water and then extracting the caffeine with an organic solvent or a caffeine-deficient solution of green coffee solubles which solution is then itself contacted with a solvent to remove the caffeine therefrom. In either case, at least some of the solvent typically contacts the beans, leaving minute traces therein. The most useful solvents are halogenated hydrocarbons, but it is becoming increasingly desirable to avoid such solvents so as to leave the coffee free of any trace solvent.

One of the more promising, although costly, alternative techniques is the use of a supercritical fluid, preferably supercritical carbon dioxide, to extract the caffeine from green coffee beans. Such a technique is disclosed in U.S. Pat. No. 4,260,639 to Zosel wherein green coffee is contacted with water-moist supercritical carbon dioxide in order to extract the caffeine. The caffeine may be absorbed from the caffeine-laden supercritical carbon dioxide by bubbling the carbon dioxide through a water reservoir, said reservoir being replaced by fresh water every 4 hours, as disclosed in U.S. Pat. No. 3,806,619 to Zosel. However, such a recovery system is highly inefficient because the water reservoir fails to provide a continuous driving force for caffeine recovery and the periodic replacement of the reservoir results in an undesirable discontinuity in the process. In still another technique, disclosed in U.S. Pat. No. 4,247,570 to Zosel, the green coffee is mixed with a caffeine adsorbent prior to contact of the coffee and the supercritical fluid. Then, as the caffeine is extracted by the supercritical fluid, it is adsorbed by the caffeine adsorbent, eliminating the need for a separate caffeine removal step. The prior art methods are batch techniques which tend to be less efficient than would be more nearly continuous methods.

It is an object of the present invention to provide a more nearly continuous method of extracting caffeine from green coffee beans with a supercritical fluid.

It is another object to produce a decaffeinated coffee of improved quality by limiting the loss of non-caffeine solids during decaffeination.

SUMMARY OF THE INVENTION

It has now been found that the objects of the invention are met by a method which involves continuously feeding an essentially caffeine-free supercritical fluid to one end of an extraction vessel and continuously withdrawing a caffeine-laden supercritical fluid from the opposite end of the vessel. Periodically, a portion of decaffeinated coffee beans is discharged at the end of the vessel to which the caffeine-free supercritical fluid is fed while a portion of undecaffeinated beans is charged to the opposite end. The caffeine-laden supercritical fluid is then fed to a countercurrent liquid absorber wherein caffeine is transferred from the supercritical fluid to a polar fluid. The then essentially caffeine-free supercritical fluid is recycled to the extraction vessel.

DETAILED DESCRIPTION OF THE INVENTION

Figure 1:
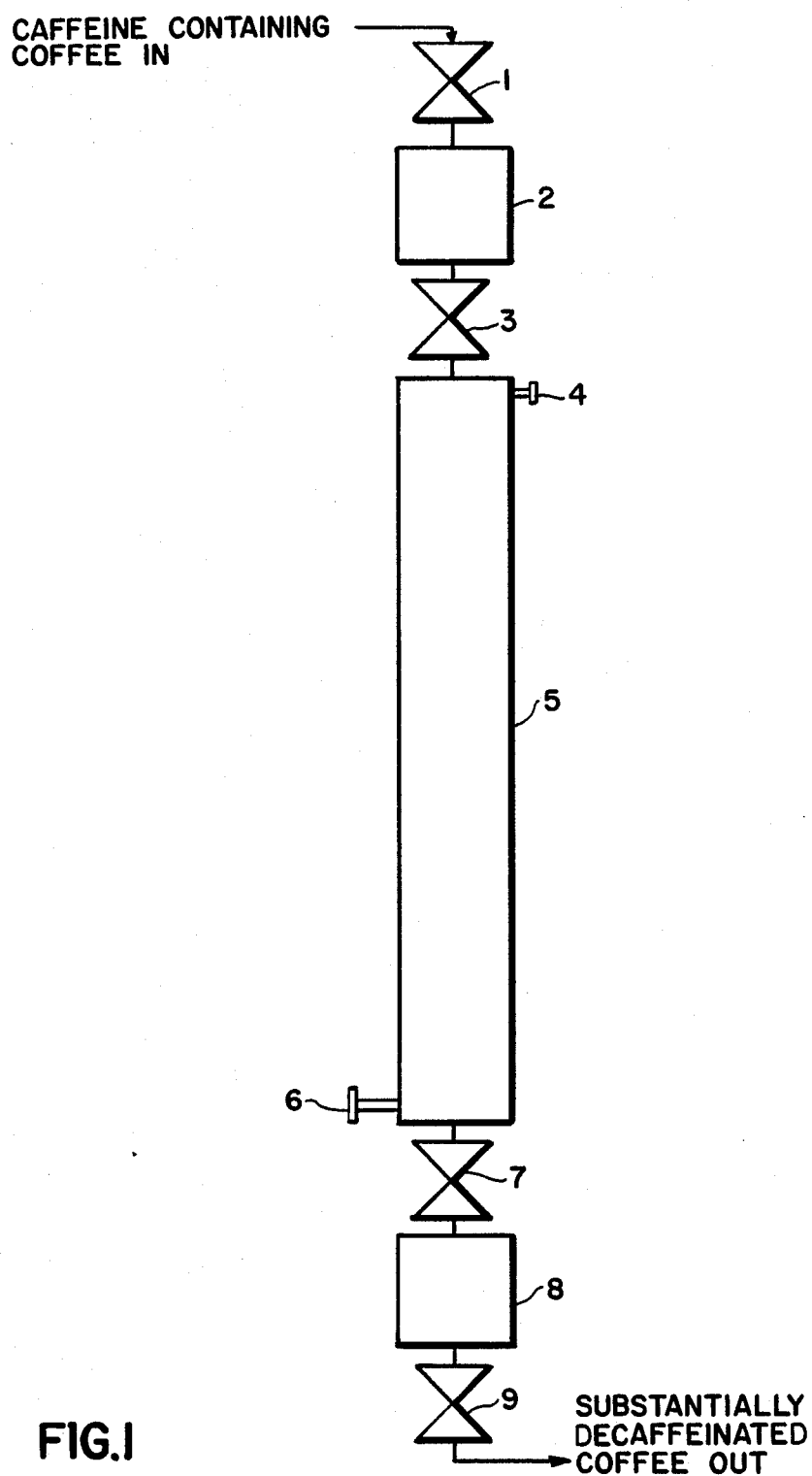
FIG. 1 is a schematic illustration showing an extraction vessel.

According to the present invention, caffeine is extracted from the green coffee beans with a supercritical fluid. A supercritical fluid is a fluid, typically one which is gaseous at ambient conditions, which is maintained at a temperature above its critical temperature and at a pressure above its critical pressure. Suitable supercritical fluids for use in the present invention include carbon dioxide, nitrogen, nitrous oxide, methane, ethylene, propane and propylene. Carbon dioxide, having a critical temperature of 31° C. and a critical pressure of 72.8 atmospheres, is particularly preferred. Carbon dioxide is abundantly available, relatively inexpensive, non-explosive and thoroughly safe for use in food processing. The supercritical fluids may be used either individually or in combinations, as mixed supercritical solvents.

In addition, a so-called enhancer may be added to the supercritical fluid to improve the solvent characteristics of the supercritical fluid. The most useful enhancers are the low to medium boiling alcohols and esters. Typical enhancers include methanol, ethanol, ethyl acetate and the like. The enhancers may be added to the essentially caffeine-free supercritical fluids at proportions of between about 0.1% and 20.0% by weight. The enhancers contemplated for use herein are most typically not supercritical fluids at the disclosed operating conditions but rather, the enhancers are simply dissolved in the supercritical fluid, improving its solvent properties.

In one embodiment the chosen enhancer is combined with the essentially caffeine-free supercritical fluid at the described proportions prior to feeding the supercritical fluid to the extraction vessel. Alternatively, the essentially caffeine-free supercritical fluid is fed to the extraction vessel without the enhancer. The enhancer is then introduced into the extraction vessel and thereby combined with the supercritical fluid at a point at which the supercritical fluid has progressed through between one-quarter and one-third of the length of the column. Operation in this manner provides for some washing of the beans with enhancer-free supercritical fluid so as to remove any residue of the enhancer from the coffee beans.

The extraction vessels intended for use herein include those which provide for efficient contact of the green coffee beans and the supercritical fluid, and which are capable of withstanding the necessarily elevated pressures involved with the use of supercritical fluids. The preferred extraction vessel is an elongated column, having a length between four and ten times the diameter, so that the green coffee beans are maintained as a bed as the supercritical fluid passes therethrough. The extraction vessel, particularly an elongated column, is most typically situated vertically so as to take advantage of gravity in providing the movement of the beans through the vessel.

Inasmuch as the supercritical fluid extraction method is countercurrent, the end of the vessel from which the decaffeinated coffee beans are discharged is also the end to which the essentially caffeine-free supercritical fluid is fed, and the end of the vessel to which the undecaffeinated green coffee is charged is also the end from which the caffeine-laden fluid is withdrawn. For the vertical elongated vessel, it is preferable to discharge the portion of decaffeinated coffee from the bottom of the vessel so as to best use gravity in assisting the movement of the green coffee through the column. The progression of the green coffee bed through the vessel arises from the periodic discharging and charging of the portions of green coffee. When the portion of decaffeinated green coffee is periodically discharged, the weight of the coffee bed causes said bed to shift downward, with the void created at the top of the column being filled by the portion of undecaffeinated coffee which is simultaneously charged to the vessel. The net effect is the progression of the green coffee charged to the extraction vessel downward through the column whereupon the decaffeinated coffee is eventually discharged. Of course, it is not necessary to situate the column vertically nor to discharge the decaffeinated green coffee from the bottom of the vessel, but such a scheme is the most convenient, particularly with respect to charging and discharging of the green coffee beans.

In view of the high pressures involved, the periodic charging and discharging of the coffee is most easily accomplished through the use of intermediate pressure vessels known as blow cases. Blow cases are merely smaller pressure vessels of about the same volume as the portions of coffee that are periodically charged and discharged, and which are isolated on both ends by valves, typically ball valves. A blow case is situated both immediately above and below the extraction vessel and each connects therewith through one of the valves. Prior to the time for the periodic charging and discharging, the upper blow case (for the embodiment of a vertical elongated vessel) is filled with the desired volume of beans, which blow case is then isolated. The remaining void space in the blow case is then filled with the supercritical fluid so as to increase the pressure to that maintained in the extraction vessel. When it is time for the periodic charging and discharging, the valve connecting the lower and otherwise empty blow case with the extraction vessel is opened. Similarly, the valve connecting the upper blow case and the extraction vessel is opened, charging the undecaffeinated coffee beans to the vessel. Both valves are then shut. The upper blow case is essentially empty but for a small amount of supercritical fluid. The lower blow case contains the decaffeinated coffee and some supercritical fluid. The supercritical fluid in the lower blow case may be vented to a holding vessel or the upper blow case prior to emptying the beans therefrom so as to conserve the costly fluid. Alternatively, rotary locks of the sort known for use on pressure vessels may be used to provide smoother, more easily automated operation. However, such rotary locks tend to be more mechanically complex, costing more initially and generally requiring more maintenance.

The discharging of the portion of decaffeinated green coffee beans and charging of the portion of undecaffeinated beans is carried out periodically, after a period of time established as hereinbelow described. The portion of decaffeinated beans periodically discharged most preferably ranges between 5% and 33% of the volume of the green coffee contained in the extraction vessel. Similarly, the portion of undecaffeinated coffee beans periodically charged to the vessel is also measured as against the volume of the coffee bed. A height about equal to the portion of discharged decaffeinated beans is simultaneously charged to the opposite end, usually the top, of the elongated vessel. For instance, if 15% of the volume of the green coffee bed is discharged, the equivalent 15% of the volume is then simultaneously charged to the vessel as undecaffeinated green coffee beans.

Particular operating conditions are obviously related to the configuration of a given system, but the invention is most preferably operated so as to maximize productivity while providing sufficient decaffeination of the green beans, from which it is typically desired to extract at least 97% of the caffeine initially present. Two of the more important operating conditions are the weight ratio of supercritical fluid to coffee and the frequency of the periodic discharging and charging of the coffee beans. There are competing aims in choosing the optimal weight ratio. It is, of course, preferable to use the least possible amount of the supercritical fluid so as to minimize operating expense. However, use of an insufficient amount of the fluid impairs productivity and raises the caffeine concentration of the caffeine-laden supercritical fluid to its maximum obtainable level prior to reaching the desired level of decaffeination, thereby eliminating the overall driving force for the extraction of caffeine from the green coffee beans. It has been found that the weight ratio of supercritical fluid to coffee is most preferably between 30 and 100 kg. supercritical fluid/kg. coffee processed through the vessel.

The frequency of the periodic charging and discharging is also a significant operating condition related to decaffeination efficiency. It is desirable to maximize productivity but it is also important to extract the desired amount of caffeine from the beans and so the frequency of the discharging and charging must be balanced between the two objects. The most preferable frequency will depend on a given system, but it has been found that the portions of substantially decaffeinated coffee beans are conveniently discharged between about every 10 and 120 minutes. Considering that the charging of the portion of undecaffeinated green coffee beans is most preferably concurrent with the discharging of the beans, the frequency of the charging of the portions of undecaffeinated beans is also between about every 10 and 120 minutes. The total residence time of the green coffee beans in the extraction vessel is established by the frequency of the periodic discharging and charging in addition to the size of the portion periodically discharged and charged. Thus, if 15% of the volume of an elongated column is discharged (and the corresponding portion charged) every 54 minutes, the total residence time of the beans in the vessel is 6 hours. According to the limits hereinbefore set, the total residence time of the green coffee beans in the elongated vessel is between about 2 and 13 hours.

In addition, the temperature and pressure maintained in the extraction vessel are also significant operating variables because both temperature and pressure must be above the critical constants so as to give the supercritical fluid. Although there is no corresponding upper limit on the temperature or pressure, the temperature should not be so high as to damage the quality of the beans nor the pressure so high as to require excessively expensive equipment. The green beans are sensitive to the effects of temperature with different types of beans having varying degrees of tolerance for increased temperature. A temperature in excess of about 100° C. may tend to degrade the flavor of some green bean types. The rate of decaffeination, though, is favored by a relatively high temperature and so it is not desirable to feed the supercritical fluid to the vessel precisely at the critical temperature. It is preferable to maintain the temperature in the extraction vessel between about 70° C. and 140° C., and more preferable to maintain the temperature between about 80° C. and 100° C., depending on the green bean tolerance to temperature. The pressure in the vessel must be maintained at at least the critical pressure in order to provide for the supercritical fluid. It has long been known that increasing pressure increases the solvent capacity of the supercritical fluid. However, a point is reached, typically at around 400 atmospheres, where the increased capacity does not justify the added expense of maintaining such pressures.

It may be desirable to introduce moisture into the system to facilitate decaffeination. The undecaffeinated green coffee beans may be moisturized prior to charging the beans through the extraction vessel, solubilizing the caffeine contained in the beans, thereby making the solubilized caffeine more easily extractable. The undecaffeinated beans are typically moisturized to between about 25% and 50% by weight moisture. In addition, the essentially caffeine-free supercritical fluid may be saturated with water prior to being fed to the extraction vessel. Such saturation of a supercritical fluid is typically between about 1% and 3% by weight moisture. Decaffeination efficiency is thus increased by introducing moisture into the system.

It has been found according to the present invention that countercurrent operation of the supercritical fluid caffeine extraction step achieves an improved decaffeination efficiency and allows the production of a decaffeinated coffee of improved quality over prior art systems. The contact of a supercritical fluid with caffeine-containing green coffee beans results in a partitioning of caffeine between the fluid and the beans regardless of the system design. It is, of course, desirable to partition as much caffeine from the beans into the fluid as is possible. However, said partitioning is limited by the relative solubility of the caffeine in the supercritical fluid versus its solubility in the green coffee bean. A partition coefficient may be calculated based on experimental measurements at a given set of conditions, said partition coefficient being defined as the concentration of caffeine in the supercritical fluid divided by the concentration of caffeine in the green coffee beans, at an equilibruim point. The conditions which generally effect a partition coefficient include temperature, pressure, and moisture level of the green beans. For example, the partition coefficient for supercritical $CO_2$ as a caffeine solvent for green coffee beans has been calculated to be 0.026 at a temperature of about 85° C., a pressure of about 250 barr, and a green bean moisture level of about 35 to 40% by weight.

It has been found that the continuous counter-current system of the present invention offers a tremendous advantage over prior art batch systems because the caffeine-laden supercritical fluid, just before it exits the extraction vessel, is then in contact with fresh green coffee beans having the green coffee's naturally occurring caffeine level. The naturally occurring caffeine level differs depending on the type of green beans being decaffeinated. For example, Robusta coffees typically have a caffeine level of about 2.0% by weight whereas Colombian coffees are typically about 1.1% by weight caffeine, as is. Because the exiting supercritical fluid is in contact with fresh green beans, the caffeine concentration in the exiting supercritical fluid increases to its asymptotic limit, or nearly thereto, based on the caffeine partition coefficient for the given fluid. It has been found that with counter-current operation the caffeine concentration in the supercritical fluid exiting the extraction column is typically at least 50% of the maximum obtainable caffeine concentration and preferably at least 70% of the maximum obtainable caffeine concentration, the maximum obtainable caffeine concentration being defined by the partition coefficient and the naturally occurring caffeine level in the green coffee being decaffeinated. Such a high caffeine concentration is very desirable because it reflects an efficient decaffeination system and it enables efficient recovery of the caffeine from the supercritical fluid as a valuable byproduct.

In a batch system, however, as caffeine is partitioned from the green coffee beans contained therein, the maximum caffeine concentration obtainable in the supercritical fluid drops dramatically. Thus, a much larger amount of supercritical fluid is necessary in a batch system as compared to the countercurrent extraction system of the present invention to achieve the same degree of decaffeination. This increased caffeine concentration achieved by the countercurrent extraction of the invention is particularly important in allowing efficient recovery of the caffeine from the supercritical fluid.

Several caffeine removal techniques are known in the art. For example, the caffeine-laden supercritical fluid may be passed through an absorbent bed, such as a bed of activated carbon, to absorb the caffeine. Alternatively, the caffeine may be recovered by lowering the pressure of the caffeine-laden supercritical fluid so as to precipitate out both the caffeine and any enhancer that might be used. However, it has been found that supercritical fluids are not entirely selective for caffeine, but rather typically extract both non-caffeine solids and caffeine. For example, supercritical carbon dioxide typically extracts non-caffeine solids and caffeine at a weight ratio of about 1.5:1 to 3:1 non-caffeine solids to caffeine. Thus, if super-critical carbon dioxide extracts caffeine from green coffee so as to increase its caffeine concentration to 220 ppm, said fluid will also contain about 300 to 660 ppm non-caffeine solids. It has been found that the two methods described above for caffeine recovery, namely absorption and depressurization, fail to selectively recover caffeine. Rather, non-caffeine solids which are important to the flavor quality of coffee are lost from the supercritical fluid with the caffeine during caffeine recovery.

According to the present invention, the caffeine-laden supercritical fluid removed from the caffeine extraction vessel is continuously fed to a countercurrent liquid absorber. Continuous counter-current liquid absorption systems are impractical and uneconomical for use in prior art supercritical fluid decaffeination systems because of the low caffeine concentration in the caffeine-laden supercritical fluid exiting the batch extractor. However, not only is a countercurrent absorber efficient and economical as used in the present invention, but it has additionally been found that polar fluids exhibit an excellent selectivity for caffeine when contacting caffeine-laden, non-caffeine solids containing supercritical fluids. As such, as the essentially caffeine-free supercritical fluid exits the absorber, it typically contains very nearly the same level of non-caffeine solids as it did upon entering the absorber. Thus, if this fluid is recycled to the caffeine extraction vessel, it extracts no measurable amount of non-caffeine solids from the green beans then being decaffeinated. As a result, the decaffeinated beans produced by the present invention are of a better flavor quality. Additionally, the yield loss generally associated with non-caffeine solids loss is eliminated by the process of the present invention.

According to the invention, the liquid absorber is operated under supercritical conditions. Typically, the temperature and pressure within the absorber are identical, or very nearly identical, to the temperature and pressure conditions in the extraction vessel. As discussed hereinabove, the critical temperature and pressure will vary depending on the fluid employed. Absorber design is considered to be well within the ordinary skill of one in the art. Typically, the absorber is operated with a packing selected from those readily available in the art. Generally, the polar fluid is contacted with the supercritical fluid at a weight ratio of about 5:1 to 25:1, and typically about 10:1 to 20:1, supercritical fluid to polar fluid. Water is the preferred polar fluid for use in the continuous countercurrent absorber of the present invention. It is preferred that the polar fluid of the invention remove at least 90% by weight of the caffeine contained in the caffeine-laden supercritical fluid, and more preferably 95% of the caffeine by weight.

The invention is further described by reference to the figures. FIG. 1 shows a preferred embodiment of the caffeine extraction vessel. At steady state conditions, the extraction vessel 5 is filled with a bed of green coffee beans. An essentially caffeine-free supercritical fluid is fed to the first end of the extraction vessel 6 and caffeine-containing supercritical fluid is withdrawn from the second end of the extraction vessel 4. Green coffee is periodically admitted through valve 1 into blow case 2. Valves 3 and 7 are simultaneously opened intermittently so as to charge the green coffee from blow case 2 to the second end of the extraction vessel 4 and discharge a portion of substantially decaffeinated green coffee beans from the first end of the extraction vessel 6 to blow case 8. Valves 3 and 7 are then closed. Valve 9 is then opened to discharge the substantially decaffeinated green coffee from blow case 8. Additional green coffee is admitted through valve 1 into blow case 2 and the procedure is repeated.

Figure 2:
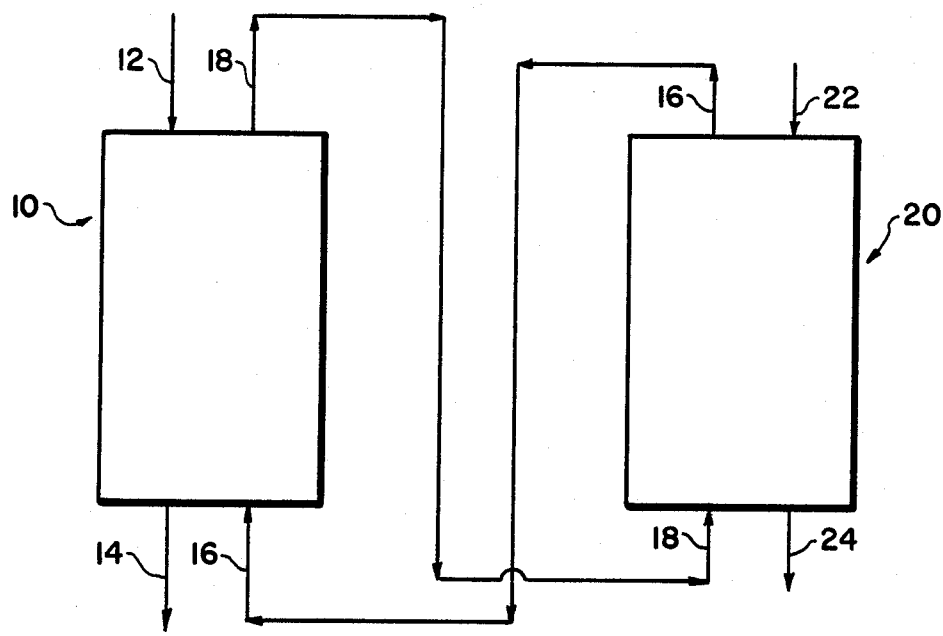
FIG. 2 is a schematic illustration showing a system for decaffeinating green coffee in an extraction vessel and recovering caffeine from the caffeine solvent in a liquid absorber.

FIG. 2 is a schematic illustration of a decaffeination system according to the invention wherein green coffee (12) is fed to an extraction vessel (10) and is removed therefrom as decaffeinated green coffee (14). An essentially caffeine-free supercritical fluid is fed countercurrently to the green beans as stream 16 into the extraction vessel, and exiting as a caffeine-laden fluid stream (18). The caffeine-laden stream (18) is then fed to a water absorber (20) and exits as an essentially caffeine-free supercritical fluid stream (16). Countercurrently, water is fed as stream 22 to the water absorber and exits as an aqueous caffeine-containing stream (24).

EXAMPLE 1

An elongated pressure vessel having a height about five times its diameter was loaded with 100% Colombian green coffee which was prewet to a moisture of about 30% to 40% by weight. Approximately 120 pounds of green coffee were contained in the pressure vessel. To the bottom of the pressure vessel was continuously fed essentially caffeine-free supercritical carbon dioxide at a pressure of about 250 atm. and a temperature of about 130° C. The carbon dioxide extracted caffeine and non-caffeine solids from the green coffee as it moved upwardly through the pressure vessel. The caffeine-laden supercritical carbon dioxide which also contained non-caffeine solids continuously exited the top of the pressure vessel. Each nineteen minutes, approximately 10% of the volume of the coffee bed was discharged into a bottom blow case while the same volume of prewet Colombian coffee was simultaneously charged from a previously loaded top blow case into the top of the pressure vessel. The total residence time of the green coffee in the pressure vessel was about 3 hours. The weight ratio of supercritical carbon dioxide to coffee was about 50 kg. carbon dioxide/kg. coffee.

The caffeine partition coefficient for supercritical carbon dioxide and green coffee beans has been measured to be about 0.026 at these operating conditions. The average caffeine concentration for Colombian Milds coffee is about 1.22% by weight on a dry basis or about 1.08% by weight as is. Thus, the maximum obtainable caffeine concentration in the supercritical carbon dioxide is about 280 ppm. The caffeine-laden supercritical carbon dioxide exiting the top of the pressure vessel was found to have a caffeine concentration of about 200 ppm, or about 71% of the maximum obtainable caffeine concentration. The caffeine-laden supercritical carbon dioxide was also found to contain about 350 ppm non-caffeine solids. The coffee discharged to the bottom blow case was found to be at least 97% decaffeinated by weight.

EXAMPLE 2

The caffeine-laden supercritical carbon dioxide from Example 1 was continuously fed to the bottom of an absorber measuring 4.3 inches in diameter, 40 feet in height, and with 32 feet packing height. The carbon dioxide was fed at a rate of 1350 lbs/hr. Water was fed to the top of the absorber at a rate of 110 to 120 lbs/hr. The absorber was operated at a pressure of about 250 atm. and a temperature of about 130° C. The following Table demonstrates the excellent selectivity for caffeine exhibited by the water, yielding a caffeine purity of about 88%.

TABLE

| | Rate (lb/hr) | Caffeine Conc. (PPM) | Non-Caffeine Solids Conc. (PPM) |
|---|---|---|---|
| CO₂ Feed To Absorber | 1350 | 200 | 348 |
| CO₂ Exit From Absorber | 1350 | 19 | 332 |
| Water Feed To Absorber | 110–120 | 0 | 171* |
| Water Exit From Absorber | 110–120 | 2,450 | 340* |

*Includes 171 ppm non-caffeine solids attributable to hardness of water.

The essentially caffeine-free supercritical carbon dioxide exiting the absorber was recycled to the extraction vessel of Example 1. The decaffeinated green coffee beans produced by recycling the essentially caffeine-free carbon dioxide containing non-caffeine solids was used to prepare a coffee brew (A). A control coffee brew (B) was prepared from identical beans decaffeinated with supercritical carbon dioxide which was essentially free of caffeine and non-caffeine solids. This supercritical caffeine stream had passed through an activated carbon bed which had adsorbed caffeine and non-caffeine solids from a caffeine-laden supercritical carbon dioxide stream generated by the process of Example 1. Coffee brew A was judged by a panel of expert coffee tasters to be of superior flavor quality as compared to coffee brew B. The improved flavor quality of brew A was attributed to the presence of non-caffeine solids in the recycled carbon dioxide which prevented the loss of valuable flavor compounds from the green beans during decaffeination.

I claim:

1. A method of extracting caffeine from green coffee comprising:
   (a) continuously feeding essentially caffeine-free supercritical carbon dioxide containing non-caffeine solids and saturated with water to the lower end of an elongate, substantially vertical extraction vessel containing green coffee beans having a moisture content of 25–50% by weight, continuously countercurrently contacting the supercritical carbon dioxide and the green coffee beans in said extraction vessel to affect extraction of caffeine from the coffee into the supercritical carbon dioxide, and continuously withdrawing supercritical carbon dioxide containing caffeine and non-caffeine solids from the upper end of the extraction vessel;
   (b) discharging a portion of the coffee beans in said vessel from the lower end of the extraction vessel, the discharged portion comprising decaffeinated coffee beans;
   (c) moving the remaining coffee beans downwardly in the extraction vessel to an extent corresponding substantially to the amount of decaffeinated coffee beans discharged from the extraction vessel;
   (d) introducing moist green coffee beans having a moisture content of 25–50% into the upper end of said extraction vessel in an amount corresponding substantially to the amount of decaffeinated coffee beans discharged from the extraction vessel;
   (e) maintaining the temperature in the extraction vessel at from 80°–140° C.;
   (f) feeding the supercritical carbon dioxide containing caffeine and non-caffeine solids withdrawn from the upper end of the extraction vessel to an absorber;
   (g) continuously countercurrently contacting the supercritical carbon dioxide containing caffeine and non-caffeine solids with water in the absorber at a temperature and pressure substantially the same as in the extraction vessel to extract substantially all of the caffeine contained in the supercritical carbon dioxide but extracting no appreciable amount of said non-caffeine solids therefrom;
   (h) withdrawing caffeine-laden water from the absorber;
   (i) withdrawing substantially caffeine-free supercritical carbon dioxide containing non-caffeine solids from said absorber;
   (j) recycling the substantially caffeine-free supercritical carbon dioxide containing non-caffeine solids to the lower end of the extraction vessel as required by step (a); and
   (k) periodically repeating steps (b), (c) and (d) while carrying out steps (a) and (e) through (j) to effect extraction of caffeine from said green coffee beans.

2. A method according to claim 1 wherein, in step (a) the caffeine concentration in the supercritical carbon dioxide withdrawn from the upper end of the extraction vessel is at least 50% of the maximum obtainable caffeine concentration, said maximum obtainable caffeine concentration being defined by the caffeine partition coefficient for said supercritical carbon dioxide.

3. A method according to claim 2 wherein said caffeine concentration is at least 70% of said maximum.

4. A method according to claim 1 wherein the amount of coffee beans discharged from and introduced into said extraction vessel is between about 5 and 33% of the volume of the coffee beans contained in the extraction vessel.

5. A method according to claim 4 wherein the discharging of coffee beans from and the introducing of coffee beans into said extraction vessel are carried out between about every 10 minutes and 120 minutes.

6. A method according to claim 1 wherein the weight ratio of supercritical carbon dioxide to coffee beans is between 30 and 100 kg supercritical carbon dioxide/kg coffee.

7. A method according to claim 1 wherein the discharging of coffee beans from and the introducing of coffee beans into said extraction vessel are carried out via blow cases.

8. A method according to claim 1 further comprising combining an enhancer with said caffeine-free supercritical carbon dioxide prior to feeding the supercritical carbon dioxide to said extraction vessel.

9. A method according to claim 1 wherein, in step (g), at least 90% of the caffeine and less that 5% of the non-caffeine solids are transferred from the supercritical carbon dioxide to the water.

10. A method according to claim 1 further comprising recovering caffeine from the caffeine-laden water withdrawn from said absorber.

* * * * *